Nov. 25, 1941.    T. A. BOWERS    2,263,756
PISTON RING
Filed Aug. 4, 1939
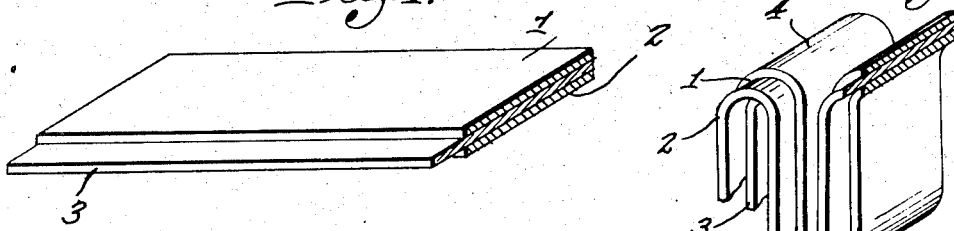
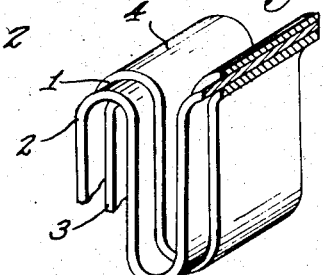
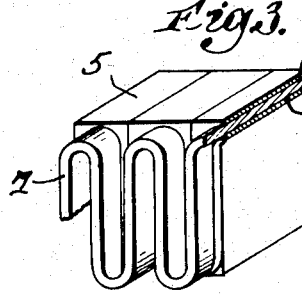
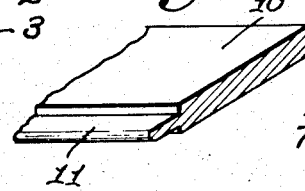
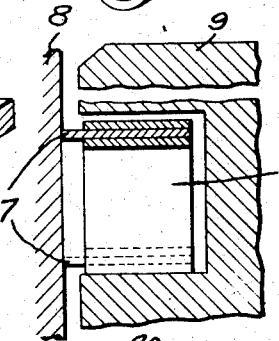
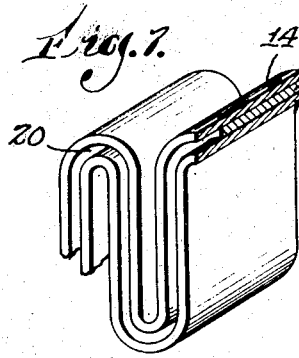
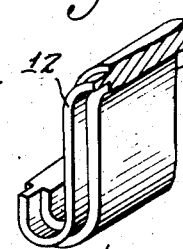
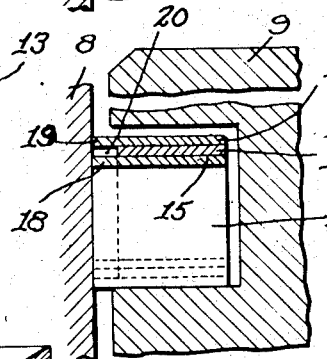
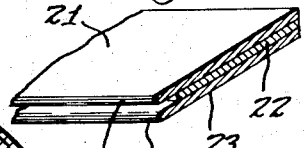
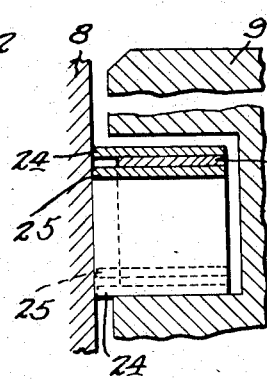
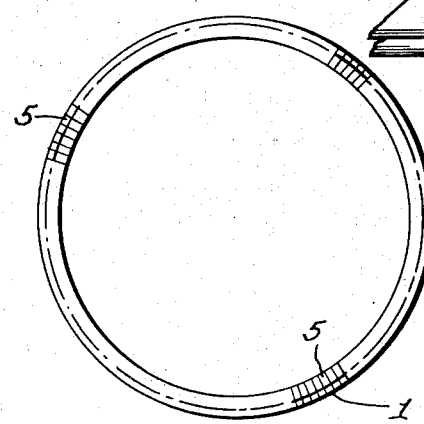
Inventor
Thomas A. Bowers
By Murman H. Hamith
Attorney Patented Nov. 25, 1941

2,263,756

UNITED STATES PATENT OFFICE 2,263,756

PISTON RING

Thomas A. Bowers, Boston, Mass., assignor to Power Research Corporation, Boston, Mass., a corporation of Massachusetts Application August 4, 1939, Serial No. 288,385

5 Claims. (Cl. 309—44)

This invention relates to piston rings and more especially to oil control rings formed from strips of metal ribbon.

In my co-pending application, Ser. No. 288,146, filed August 3, 1939, I have referred to difficulties in maintaining proper distribution of oil in worn cylinders, at high engine speeds, and I have described and claimed a ring fabricated from a plurality of lengths of metal ribbon so designed as to present an increased range of wall pressure for overcoming these difficulties. In my earlier application, the several lengths of metal ribbon were reversely folded upon themselves and compacted to form an annular body in which ribbon edges made up inner and outer peripheries of a ring. It has been found that more desirable operation of these fabricated structures as oil rings may be obtained by rearranging the strips of material to provide improved ring peripheries.

It is a chief object of this invention to provide improved ring structures for effecting oil distribution on a cylinder wall with a view to particularly overcoming faulty oil distribution in cylinders which have become worn and which are subject to high-speed operation. The invention also aims to provide a simple, cheap, and efficient piston ring structures, and a method of manufacture in which a plurality of strips of piston ring material is arranged in novel manner to effect improved ring peripheries. Attainment of these and other objects of the invention will be readily understood from the following description when read in connection with the accompanying drawing, and the novel features will be more particularly pointed out in the appended claims.

In the drawing:

Fig. 1 is a perspective view illustrating fragmentarily a method of assembling a plurality of strips of piston ring material.

Fig. 2 is another perspective view illustrating the step of reversely folding the ribbon assembly of Fig. 1.

Fig. 3 is another perspective view illustrating a further step of compacting the reversely folded material upon itself and thereafter forming crown portions to comprise a finished ring.

Fig. 4 is a fragmentary view illustrating in cross section a piston and cylinder having assembled therein a ring of material similar to that resulting from the step illustrated in Fig. 3.

Fig. 5 is a perspective view illustrating a modification of piston ring material.

Fig. 6 is a perspective view fragmentarily illustrating a reversely folded piston ring portion formed from a material such as that illustrated in Fig. 5.

Fig. 7 is a perspective view illustrating a modified method of assembling a plurality of strips of piston ring material.

Fig. 8 is an assembly view illustrating a ring formed from material similar to that shown in Fig. 7, associated with a piston and cylinder.

Fig. 9 is a perspective view illustrating another modification of piston ring material.

Fig. 10 is an assembly view illustrating a piston ring formed from a material similar to that illustrated in Fig. 9; and Fig. 11 is a plan view of a finished ring such as that illustrated in Figs. 3 and 4.

In accordance with my invention I provide two strips of piston ring material 1 and 2, which are of the same width, and I interpose therebetween a third strip of material 3 which has a greater width than the strips 1 and 2, with the result that there is effected a projecting portion. The material preferably will comprise a steel ribbon, although other materials may be employed as set forth in my co-pending applications Ser. No. 288,146 filed August 3, 1939, and Ser. No. 276,503, filed May 31, 1939. The plurality of ribbons is maintained in the relative position shown in Fig. 1 and reversely bent in the manner illustrated in Fig. 2 to present folded portions 4. A length of the reversely folded material is then compacted and formed to comprise an annular ring body as fragmentarily illustrated in Fig. 3 with the folded portions 4 becoming flattened and formed to comprise crowns 5. It will be noted that a length of this material may be compacted upon itself and when released will exert a radial pressure uniformly in all directions. Also, increasing the number of ribbons or strips will increase the range of the radial pressure.

The ring body resulting from this construction comprises an inner diameter 6 made up of a substantially solid mass of ribbon material, and an outer diameter made up of relieved oil scraping edges 7 formed from the wide strip 3 for engaging against a cylinder wall 8 when assembled about a piston 9, as illustrated in Fig. 4. The crowns 5 and oil scraping edges 7 are more clearly illustrated in the plan view of Fig. 11. The crowns 5, in making up the substantially solid mass above referred to, constitute land surfaces at opposite sides of the ring. These land surfaces are of a substantially continuous nature, by which the ring may seal against one side of a piston groove to prevent passage of oil between the ring and the piston groove.

It will be observed that by disposing the protruding edge of the ribbon 3 to comprise the outer periphery of the body, I have provided relatively small oil scraping edges for the ring, which results in there being effected a reduction in unit area of ring surface bearing on the cylinder. With a given amount of wall pressure developed in a ring formed from three ribbons, such as 1, 2 and 3, upon decreasing the area of the ring which engages the cylinder, increased pressure is exerted by the ring edge on the cylinder, which may tend to effect a more efficient oil scraping and metering, particularly in worn cylinders. The scraping edges 7 by their thinness are also adapted to easily and quickly wearing in on a cylinder wall. In addition, there is provided a relatively strong supporting structure made up of three ribbon portions which are formed to take a great part of the wear when the ring is in operation. If desired, various kinds of metal may be employed in forming the three-ribbon structure shown. For example, I may employ two relatively soft strips of copper either side of a strip of steel, or the reverse of this arrangement may be resorted to. In place of a wide strip as 3, I may utilize a strip of conventional width but arranged so that a projecting edge is still maintained. Other arrangements and numbers of strips may also be resorted to in effecting similar oil scraping functions.

In Figs. 5 and 6 I have shown a modification of piston ring which is formed from a single strip of material 10, having one edge thinned to provide a projecting edge 11 which may be employed to comprise an oil scraping edge 12 in a finished ring 13, as illustrated in Fig. 6. However, the ring formed from a plurality of ribbons as illustrated in Figs. 1-4 inclusive, has the advantage that minute oil passages may be comprised between the separate leaves resulting from reversely folding separate strips, which would not be possible from the single ribbon structure, as may be readily seen in Fig. 6. The modification of Fig. 6 does have the advantage of simplicity, easier assembly, and cheapness.

In Figs. 7 and 8 I have illustrated a further modification of multiple ribbon assembly, in which it will be noted that I have provided two strips of ribbon 14 and 15, and a central relatively narrower strip 16. Upon reversely folding this ribbon assembly and forming it into a piston ring 17 as illustrated in Fig. 8, there results a plurality of oil scraping edges 18 and 19. While there occurs less pressure by each edge on the cylinder, than is the case where a single edge is employed, it will be observed that the close association of the edges results in an opening 20 which may act as an oil reservoir. The immediate function of this reservoir is to develop hydraulic pressure from oil being continually pressed into the opening 20 when the ring is reciprocated on the cylinder wall. Oil will be forced between the several leaves of material 14, 15 and 16, thereby developing an improved circulation of oil back to the piston groove. In addition, oil circulation may be effected between the points of folding, particularly if the material is employed in a slightly stretched apart state, and this is also pertinent with respect to the modification of Fig. 3.

In Fig. 9 I have shown another modification of ring material which consists in strips of material 21, 22 and 23, of which strips 21 and 23 may be formed with rounded edges 24 and 25. In Fig. 10 I have illustrated the edges 24 and 25 occurring in a finished ring and engaged with a cylinder. It will be seen that these rounded edges further facilitate "wearing in" of the ring and are adapted to engage more readily against worn areas of a cylinder, particularly when the strips are composed of a hard material such as steel.

It will be noted that by the construction shown I may secure improved oil control and oil metering functions in a fabricated ring by developing more pressure on a cylinder wall from a given length of reversely folded material, by increasing ease of wearing in, by utilizing a hydraulic pressure for re-circulating oil picked up by the ring, and by strengthening those portions of a ring body which are subjected to wear in the piston groove. In addition, I have introduced a novel step in the fabrication of a flexible piston ring, and I have provided a ring which is simple, durable and cheap to manufacture.

It should be understood that various modifications may be resorted to in the construction of and application of the ring structures shown herein while continuing to adhere to the spirit of the invention.

I claim:

1. An improved packing comprising a plurality of ribbon members reversely folded upon one another and compacted to comprise an annular body, one of said ribbon members projecting outwardly from the remaining ribbon members thereby to comprise a periphery of the said body.

2. A flexible piston ring comprising a plurality of strips of sheet material reversely folded upon one another and compacted to comprise a ring body, said ring body having bent portions of the strips flattened to provide land surfaces at opposite sides thereof, one of said strips of sheet material having an edge extending beyond the said land surfaces in a direction radially of the ring body.

3. A flexible piston ring comprising a plurality of strips of piston ring material reversely folded upon one another and compacted into a ring body, edges of said strips being arranged in offset relation at the outer periphery of the ring body, and said ring body having bent portions flattened to form land surfaces for sealing the ring in a piston groove.

4. An improved piston ring comprising a plurality of strips of piston ring material reversely folded upon one another and formed into a ring body, said ring body having bent portions of the strips formed to provide land surfaces at opposite sides of said body, and oil scraping portions extending beyond the said land surfaces in a direction radially of the ring body, said oil scraping portions consisting of edges of strips which occur in spaced-apart relation.

5. A flexible piston ring comprising a plurality of layers of sheet material reversely bent to form a substantially solid ring body, said ring body having bent portions of the sheet material flattened to provide land surfaces, and spaced-apart edges extending beyond the said land surfaces in a direction radially of the substantially solid ring body, said spaced-apart edges occurring out of the plane of the land surfaces.

THOMAS A. BOWERS.